United States Patent [19]

Frische et al.

[11] 4,098,133
[45] Jul. 4, 1978

[54] VIBRATING DIAPHRAGM FLUID PRESSURE SENSOR DEVICE

[75] Inventors: Richard H. Frische, Phoenix, Ariz.; Timothy T. Maxwell, London, England

[73] Assignee: Sperry Rand Corporation, New York, N.Y.

[21] Appl. No.: 797,223

[22] Filed: May 16, 1977

[51] Int. Cl.² ............................................. G01L 9/14
[52] U.S. Cl. ..................................... 73/702; 73/728
[58] Field of Search ............. 73/398 R, 398 C, 407 R; 331/65

[56] References Cited

U.S. PATENT DOCUMENTS

| 3,425,281 | 2/1969 | Barz | 73/398 C |
|---|---|---|---|
| 3,456,508 | 7/1969 | Frische | 73/398 R |

*Primary Examiner*—Donald O. Woodiel
*Attorney, Agent, or Firm*—Howard P. Terry

[57] ABSTRACT

A fluid pressure responsive transducer is disclosed of the kind having a thin flat vibrating diaphragm serving as a wall of a continuous pressure chamber for converting a variable fluid pressure magnitude directly into a variable frequency electrical signal. The thin flat diaphragm, secured only at its periphery to the chamber, becomes progressively stiffer as it is progressively deformed by fluid pressure loading more and more from its flat or unstressed position. A dual cavity configuration of the pressure chamber is formed by a rigid divider wall with a restricted passage therethrough. The effects of disturbing acoustic waves which might otherwise be generated interior of the fluid chamber or within pneumatic lines coupled thereto are thus suppressed.

13 Claims, 3 Drawing Figures

VIBRATING DIAPHRAGM FLUID PRESSURE SENSOR DEVICE

BACKGROUND OF THE INVENTION

1. Field of the Invention

The present invention pertains to fluid pressure responsive apparatus and more particularly concerns a vibrating diaphragm sensor apparatus for converting fluid pressure magnitude directly into an electrical signal whose frequency varies as a function of that applied fluid pressure.

2. Description of the Prior Art

The immediate prior art vibrating diaphragm fluid pressure sensor is that of the R. H. Frische U.S. Pat. No. 3,456,508, issued July 22, 1969, and assigned to Sperry Rand Corporation. In this prior Frische patent, antecedent concepts for pressure sensors generally unsuited for application in aircraft digital air data and altitude sensing systems are also discussed. The device of the former Frische patent overcomes limitations of such prior art transducers by use of a simple, flat diaphragm not requiring association with a vibrating wire. Further, it directly measures gas pressure rather than gas density with the change in the diaphragm vibrating frequency resulting from changes in the mechanical spring rate of the diaphragm as a function of fluid pressure loading. Most important, the device has an output frequency variation substantially greater than prior art devices over pressure ranges of interest particularly in air data and altitude sensing systems.

In more particularity, the device of the prior Frische patent utilizes a pressure chamber having a wall defined by a flat diaphragm uniformly restrained at its periphery and subjected to fluid pressure differences between one side and the other. The diaphragm becomes stiffer in a non-linear fashion the farther it is deformed from its flat or unstressed position by the varying pressure of fluid acting on one of its sides. Thus, the diaphragm deforms easily for the first several increments of applied fluid pressure but, as the pressure is progressively increased, additional deformation progressively diminishes. The diaphragm may properly be considered as a spring-mass mechanical system, and it can therefore be driven at a characteristic resonant frequency which is a function of its effective mass and spring stiffness. As the diaphragm is deformed to a lesser or greater degree by changes in gas pressure, its stiffness changes and its mechanically resonant frequency changes as a true function of applied pressure. Thus, the flat diaphragm system provides the desired pressure-to-frequency conversion characteristic needed for digital pressure measurement applications.

The vibrating diaphragm sensor of the prior Frische patent has been widely accepted as a reliable and accurate means for measuring gas pressure, many problems associated with the structural design of the vibrating diaphragm itself and with thermal and vibration isolation from the environment having been generally resolved. The pressure chamber geometry is determined largely by factors inherent in the design and successful manufacture of the vibrating diaphragm. However, it is found that the vibrating nature of the device may give rise to acoustic waves within the interior of its gas chamber or within the pneumatic lines coupled to the sensor which waves, under certain circumstances, interfere with the degree of precision of pressure measurement obtainable by the device. Inherently, the vibrating diaphragm pressure sensor operates over a frequency range dependent upon the range of gas pressures to be measured, and therefore the acoustic waves generated are of varying frequencies and amplitudes. These acoustic waves and their reflections can cause the prior art vibrating diaphragm sensor to be unstable or inaccurate depending upon the selected chamber geometry, and the present invention derives from an appreciation of these undesired acoustical effects upon the total performance of the vibrating diaphragm gas pressure sensor.

SUMMARY OF THE INVENTION

The present invention is an improved vibrating diaphragm fluid pressure sensor in which the effects of disturbing acoustic waves which might otherwise be present within the interior of the fluid chamber or within pneumatic lines coupled thereto are eliminated. Like the device of the prior Frische patent, the invention includes a thin flat vibrating diaphragm dividing the enclosure into two chambers, one being subjected to a first fluid pressure and the other being subjected to a second fluid pressure which may alternatively be a steady reference pressure or a second variable pressure. The vibrating diaphragm has the appropriate thinness, surface area, and resiliency that its resonant frequency changes in accordance with the relative magnitudes of the aforementioned first and second fluid pressures. A circuit acting with the vibratory diaphragm as a self-tuned oscillator includes a means for driving the diaphragm substantially at the resonant frequency of the latter over a predetermined range of operating frequencies and for providing a corresponding output signal. According to the invention, a rigid wall is supplied in one of the chambers, dividing it into two cavities, one cavity being disposed adjacent the vibratory diaphragm itself and the other being connected to the variable pressure fluid input line. A restricted passage or orifice in the rigid dividing wall provides communication between the two cavities. The relative volumes of the cavities and the orifice dimensions are selected such as to provide an acoustic filter for suppressing acoustic wave resonances, preventing them from adversely affecting the normal resonance vibrations of the diaphragm. The diaphragm and the rigid divider wall are disposed in substantially parallel relation and are separated by a distance significantly less than a quarter wave length at the highest normal operating frequency of vibration of the diaphragm, thereby widely separating the cavity acoustic resonances from the highest diaphragm operating frequency consistent with the compressibility effects of the gas on the vibrating diaphragm.

DESCRIPTION OF THE PREFERRED EMBODIMENTS

Figure 1:
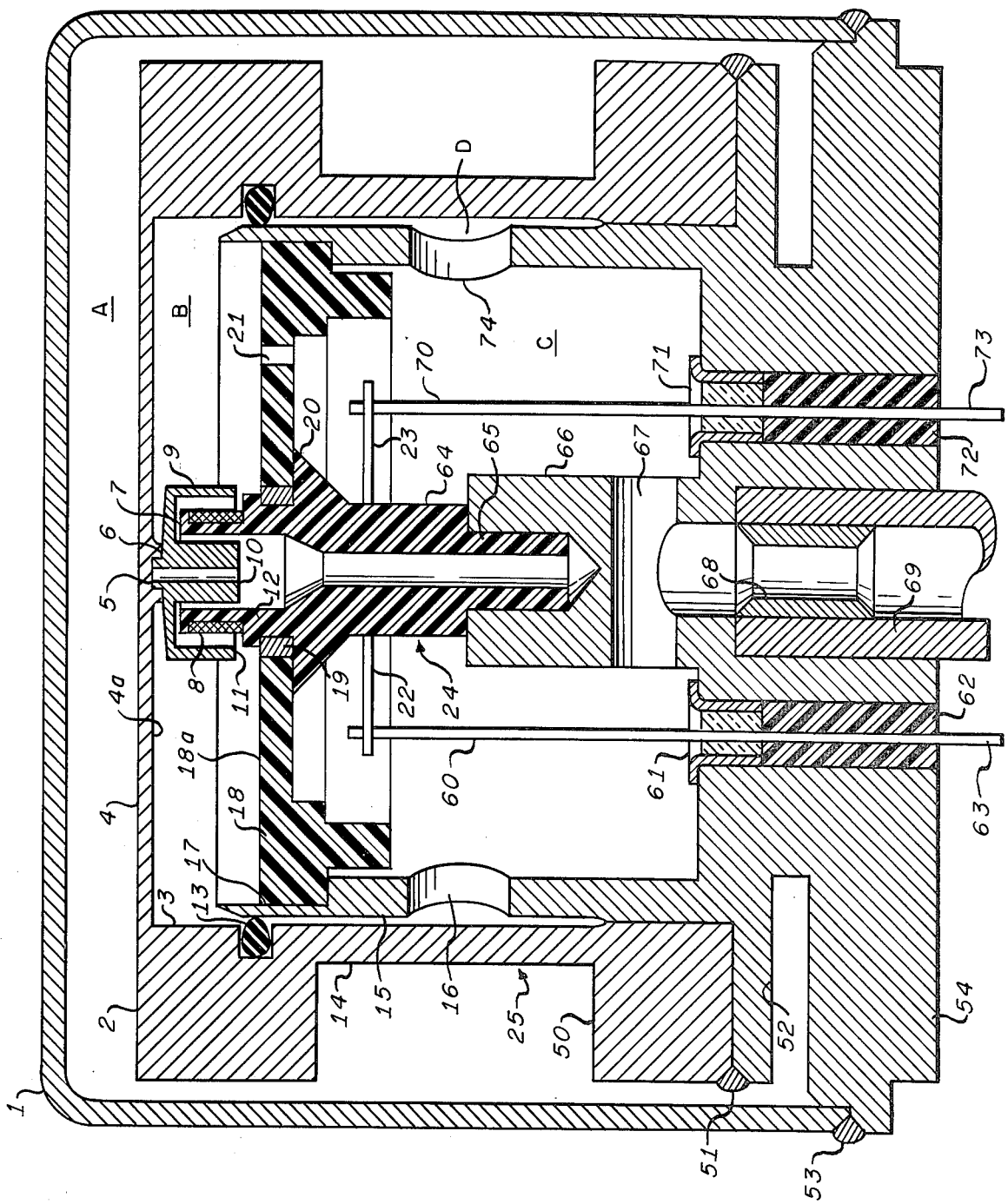
FIG. 1 is an elevation view in cross section of a preferred form of the invention.

Referring to FIG. 1, the invention includes a flat, circular, resilient metal diaphragm 4 which is formed integrally at one end of a generally cylindrical wall member 25. Though diaphragm 4 is preferably formed as an integral part of wall member 25, the diaphragm may alternatively be a separate member if uniformly welded at its periphery, as by electron beam welding, to wall member 25. Wall member 25 is provided with upper and lower annular flange members 2 and 50 encompassing an annular recessed region 14 between the flange members. Interior of the cylindrical wall 3 of wall member 25 is disposed a second hollow cylindrical member 15 which is normally formed integrally with a generally circular base member 54. A round reentrant portion 66 located on the axis of hollow cylindrical member 15 and formed integrally on the interior surface of base 54 thereof extends toward diaphragm 4 and serves as a support element for other essential parts of the invention yet to be described.

The elements of the invention thus far discussed are preferably formed, for example, of one particular metallic substance, the choice being dictated largely by the stable resiliency requirements of diaphragm 4. Since diaphragm 4 must have minimum internal hysteresis characteristics, the diaphragm and its associated elements are constructed of Be-Cu or alternatively of a commercially available alloy known as Ni-Span C. Use of such a material having substantially a zero temperature coefficient of Young's modulus over the operating range of temperatures is preferred.

The cavity-defining elements described in the foregoing are ultimately formed into an integral unit by generating an annular bond 51 between the lower annular flange member 50 and a second annular flange member 52 formed as part of base member 54, as by electron beam welding. Before the weld 51 is actually formed, two or more relatively large openings 16, 74 are bored through the cylindrical wall member 15. Also, an annular groove is formed in the inner wall 3 to accommodate O-ring 13; the latter forms a hermetic seal between wall 3 and the adjacent outer wall 15. By virtue of the openings 16, 74 and orifice 21 in the rigid divider wall 18, there are no significant long term pressure differences on the opposite sides of divider wall 18. It will be appreciated that the configuration employing O-ring 13 and the elements providing walls 3,15 permits ready assembly of the parts ultimately unified by seal 51.

Reentrant portion 66 is equipped with an axial bore within which is sealed, as by epoxy cement, an extension 65 of an insulating support element 24 composed of phenolic or a conventional compressed, molded plastic, for example. Element 24 provides support, because of its inverted truncated conical portion 20 on cylindrical portion 64, for rigid divider wall 18 and for a bobbin portion 7 supporting, in turn, the driver pick-off coil 8 above divider wall 18. Divider wall 18 may also be formed of a compressed molded plastic and is fastened at its periphery 17 by an epoxy bond to hollow cylinder 15. A central aperture of rigid divider wall 18 is fastened by an epoxy seal 19 to portion 12 of insulator 24, bobbin 7 and coil 8 being supported above portion 12. Divider wall 18 is supplied with a calibrated orifice 21 connecting the cavities on each of its sides.

At the axis of the cavity system, an axial bore 68, forming a restricted orifice is formed through base member 54, which bore 68 communicates with the interior of the device through radial bore 67 in reentrant portion 66. Bore 68 is coupled through the extended steel pipe or tube 69 to the source of variable pressure whose magnitude is to be measured. Provision is also made through base member 54 for the supply of driving electrical current to driver pick-off coil 8, as will be further described. For this purpose, the rigid conductor 60 extends through a conventional glass-to-metal seal 61. Epoxy cylinder 62 within a bore through base member 54 serves to stabilize the lead 63 to prevent shorting. Conductor 70 is similarly arranged with respect to seal 71 and cylinder 63. As will be further described in connection with FIG. 2, conductors 22, 23 are respectively bonded to conductors 60, 70, and permit current flow through coil 8. In this manner, external connection to coil 8 is provided at outer terminals 63,73.

At the periphery of base member 54, an annular electron beam weld 53 is made between base 54 and a cup-shaped outer casing 1. Casing 1 may be composed of Ni-Span C when the cavity-defining elements are of that material or of Cu when Be-Cu is used in the cavity-defining elements. It will be seen that several major cavities are formed within casing 1. A first cavity provides an isolated chamber, not being connected to the other cavities; this is the reference cavity A formed between casing 1, base member 54, cylindrical member 25, and diaphragm 4. In a static pressure application, the reference cavity or chamber A is evacuated. On the other hand, should it be desirable to employ the invention as a differential pressure measuring device, a fixed or variable pressure input similar to input pipe 69 may be readily provided near the periphery of base member 54 for communication with cavity A just below flange member 52, for example. The other three cavities B, C and D cooperatively form a second major chamber, as will be further discussed.

Figure 2:
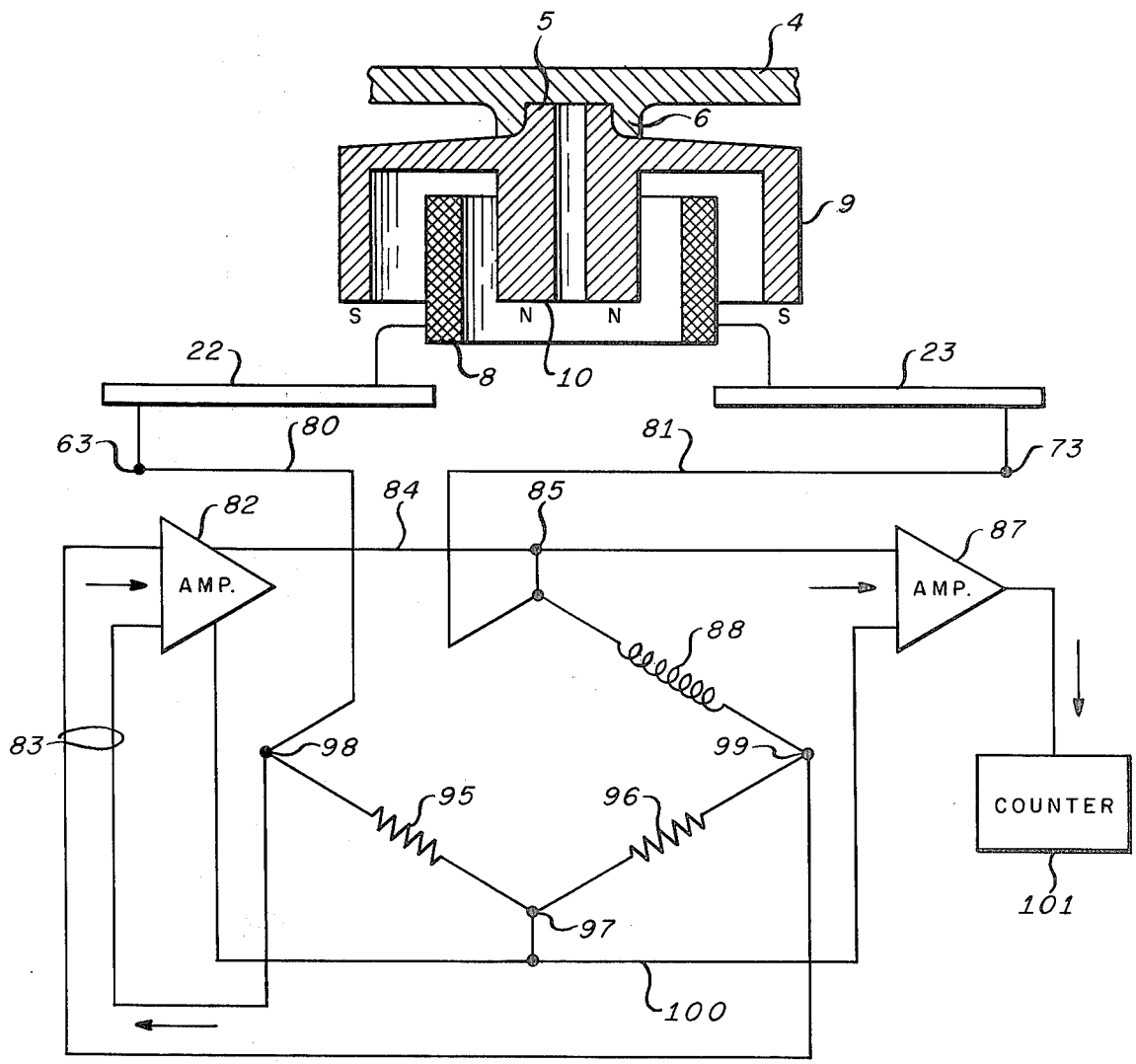
FIG. 2 illustrates, on an enlarged scale, a portion in cross section of the FIG. 1 apparatus and includes the wiring diagram of an associated measurement circuit showing electrical interconnections with the driver mechanism of FIG. 1.

The stationary driver pick-off coil 8 cooperates with a magnet assembly 9, coil 8 being supported within an annular hollow portion interior of a cup-shaped magnetic pole piece integral with and surrounding a reentrant annular pole piece, as is seen also in the enlarged view of FIG. 2. The magnet 9 assembly thus provides an intense radial magnetic field running from annular pole 10 outward to the opposite polarity annular pole 11 so as to cut the conductors of coil 8 when the armature position oscillates vertically. For this purpose, the magnet assembly is mounted in a hub 6, being sealed therein at 5 by solder, for example, hub 6 being affixed to the center of the vibratory diaphragm 4.

By applying a sinusoidal electrical signal of proper frequency to terminals 63,73 of coil 8 (see FIG. 2), diaphragm 4 is caused to vibrate at its natural mechanical resonance frequency. The transducer response reaches a resonant peak when the driving frequency is equal to the mechanical resonance frequency of diaphragm 4, the latter being determined by the pressure applied via tube 69. It is therefore possible to connect the driver, pick-off coil 8 in a feed back circuit as shown in FIG. 2, such that the back electromotive force generated as the magnet assembly moves with respect to coil 8 is connected back to the input of driver amplifier 82. In this configuration, the closed loop sensor and amplifier circuit oscillates substantially at the the electromechanical resonance frequency of the system, and the frequency of oscillation changes as a function of the pressure across diaphragm 4. The terminals 63, 73 of coil 8 are connected via leads 60,70 through the glass seals 61,71 in the base member 54 to terminals 85, 98 of a bridge circuit 88, 95, 96. The output of the bridge circuit at terminals 98, 99 is connected via leads 83 to the input of amplifier 82 in order to amplify the unbalance or feed back electromotive force signal and to apply it to coil 8 as a driving signal via the bridge circuit and leads 80,81. In this way, the closed loop circuit operates as a self-resonant electromechanical oscillator which oscillates at the natural resonance frequency of diaphragm 4. The output of amplifier 82 may be further supplied by leads 84, 100 to be amplified by an output amplifier 87 to provide an amplified signal whose frequency is the desired function of pressure to a utilization circuit such as a counter and display 101. In order to maintain the bridge circuit accurately balanced, coil 88, which forms the fourth leg of the bridge circuit, may also be disposed in the cavity C, thereby to be subjected to the same thermal environment as coil 8.

The present invention has been described with respect to a diaphragm driving and velocity detecting arrangement including a permanent magnet assembly moving with the diaphragm and cooperating with a fixed coil. It will be appreciated by those skilled in the art that other possible techniques for driving the resonant diaphragm and for detecting its motion may include a moving coil and a fixed permanent magnet assembly, an electrostatic driver with variable capacity detection, moving armature elements, piezoelectric transducers, or a fixed coil cooperating directly with the diaphragm wherein the diaphragm is fabricated, for instance, from the alloy Ni Span C, thereby eliminating the mass of the magnet from the diaphragm.

The general theory and the principles of operation of a peripherally clamped vibrating diaphragm system as used in the present invention had been adequately presented in the aforementioned Frische patent and applied equally well with respect to the behavior of diaphragm 4 of the present invention. Some further theoretical considerations will be useful in understanding the problems overcome by the present invention. To measure an absolute pressure with the prior Frische device, a first side of the vibrating diaphragm 4 is exposed to a reference vacuum. Hence, depending on the quality of the vacuum, there is essentially no acoustic response from that first side of the vibrating diaphragm within the vacuum. The acoustic response of the gas on the pressurized side of the vibrating diaphragm depends on the molecular weight and temperature of the gas and the shape of its associated chamber that is inherently an acoustic resonator at some predetermined frequency. That resonance frequency depends upon the speed of sound in the gas medium of the chamber or, assuming a constant temperature, upon the molecular weight of the gas medium. Thus, a change in the molecular weight of the gas produces a change in the resonance frequency in the gas chamber. A change in this resonance frequency produces a change in the acoustic response seen by the vibrating diaphragm and, hence, the vibrating diaphragm oscillates at different frequencies when the device is operated at the same pressure and temperature, but with different gas media. The aforementioned phenomena is commonly referred to as density sensitivity. To reduce the effect of operating the vibrating sensor diaphragm with various gases, the resonance frequency of the gas filled chamber can be made much higher than the range of operation of the vibrating diaphragm. The farther away from the vibrating diaphragm frequency range the gas filled chamber resonance is moved, the smaller the effect of a slight change in the chamber resonance frequency. To increase the resonance frequency of the chamber, the acoustical reflecting surface 18a according to the present invention is placed close (much less than one quarter wave length) to the vibrating diaphragm surface 4a. Since the speed of sound in a gas is also dependent upon gas temperature, the chamber resonance frequency is inherently also a function of temperature. However, the close reflecting surfaces 4a, 18a also reduce that portion of the temperature sensitivity of the sensor device related to the acoustic phenomena. There is additionally a temperature sensitivity related to the vibrating diaphragm 4 itself; however, the temperature sensitivity of a sensor device with close reflecting walls 4a, 18a is much less complex than the temperature sensitivity of the prior Frische device.

There is a second acoustical phenomena occurring within the gas filled pressure cavity, because the gas itself acts like a pneumatic spring. The stiffness of this pneumatic spring depends on the gas pressure within the chamber and upon the ratio of the volume of the chamber to the volume displaced per cycle of oscillation of the vibrating diaphragm. Therefore, there is a limit to how close the reflecting walls 4a, 18a of the chamber can be. The chamber must be large enough that the volume displaced by the vibrating diaphragm oscillation is small compared to the chamber volume, and so that the spring action of the gas does not become a significant portion of the total stiffness of the vibrating diaphragm. Hence, the optimum chamber geometry depends upon a balance of these two restrictions tailored empirically to a particular combination of pressure range and vibrating component characteristics.

Another problem with the vibrating diaphragm pressure sensor is related to noise within associated pneumatic lines. This noise may include acoustic waves generated by other system components or acoustic waves generated by the vibrating diaphragm itself and reflected by discontinuities in the pneumatic line back to the sensor, for example, by a coupling of reduced diameter in the pneumatic line. Other sources of acoustic wave disturbances may be related to the aircraft pressure system, the location of pressure ports on the aircraft fuselage, or the like. By use of multiple cavity configurations and orifices as provided in the present invention, these acoustic waves can be prevented from entering the primary sensor chamber. Thus, there are two phenomena associated with the pneumatics of a vibrating diaphragm pressure sensor. These are acoustical reflections from surfaces within the sensor chamber and pneumatic stiffness of the gas within the chamber. These two phenomena are controlled according to the present invention by means of proper chamber geometry and size to produce optimum performance of the vibrating diaphragm pressure sensor.

Both of these effects can be described mathematically by means of the classical wave equation:

$$C^2 \nabla^2 \phi = \frac{\delta^2 \phi}{\delta t^2}$$

where $\phi$ is the velocity potential, $\Delta$ is the conventional operator, $t$ is time, and C is the sonic velocity as defined by:

$$C = \sqrt{\frac{KRT}{m}}$$

where K is the ratio of specific heats, R is the universal gas constant, $m$ is the molecular weight of the gas, and T is the absolute temperature, all in consistent units. The wave equation may be developed by combining the continuity equation and momentum equations for a compressible, zero viscosity gas. For an axially-symmetric, cylindrical hollow resonator, the wave equation is:

$$\frac{\delta^2 \phi}{\delta r^2} + \frac{1}{r} \frac{\delta \phi}{\delta r} + \frac{\delta^2 \phi}{\delta z^2} = \frac{1}{C^2} \frac{\delta^2 \phi}{\delta t^2}$$

where $r$ is the hollow resonator radial dimension, and $Z$ is the axial dimension of the hollow resonator. A conventional technique for the separation of variables may be used to solve the above equation. For use in a mathematical model analysis of the vibrating diaphragm, the variationals of kinetic energy and potential energy are calculated from the results of the wave equation solution. These energy changes are then used in conjunction with the calculated energy of the diaphragm to determine its frequency of oscillation. The model solves for the minimum energy condition of the system.

This mathematical model accounts for the two basic disturbing phenomena, acoustical reflection and pneumatic stiffness. Acoustic waves are alternating high and low pressure regions moving through the gas medium. Acoustic waves are generated by the vibration of the diaphragm 4. These waves move through the chamber B and strike the bounding surface 18a, being reflected therefrom. Hence, after the acoustic waves are reflected from surface 18a, they travel back toward diaphragm 4. When the waves return to the surface 4a of diaphragm 4, they may or may not be in phase with the motion of the diaphragm and new waves may be generated; hence, the in-phase or resonant waves tend to add energy to diaphragm 4, tending to reinforce its oscillation; or they may be out-of-phase or anti-resonant and tend to take energy from the diaphragm and to oppose its oscillation. The acoustic waves travel at the speed of sound through the gas medium, which speed depends upon the temperature and molecular weight of the gas. Thus, for a given gas at a constant temperature, the time necessary for a wave to travel from the diaphragm surface 4a to the reflecting surface 18a and back to the diaphragm surface 4a depends on the distance traveled. Therefore, the distance from the diaphragm surface 4a to the reflecting surface 18a determines, at least for constant temperature conditions, whether the reflected wave diminishes or amplifies the oscillation of diaphragm 4.

The gas medium also acts as a pneumatic spring attached to diaphragm 4. As the diaphragm 4 oscillates, it acts on the gas in the sensor chamber. The stiffness of the gas medium is determined by the ratio of the delta volume caused by oscillation of diaphragm 4 to the total volume of the chamber. As this ratio becomes larger, the pneumatic stiffness becomes great; as the sensor chamber decreases in volume, the stiffness of the gas becomes a significant portion of the total stiffness of diaphragm 4. This phenomena may be thought of as a reflection of an acoustic wave from a reflecting surface very close to the diaphragm as compared to the wave length of the acoustic wave. That is, a region one wave long fills the entire chamber.

Therefore, it is seen that the optimum chamber configuration consists of a compromise with respect to the foregoing acoustic phenomena. The optimum compromise depends upon the operating pressure range and the characteristics of the vibrating diaphragm. The areas to be improved by controlling the acoustic phenomena are:

1. molecular weight sensitivity of the absolute sensors,
2. temperature sensitivity of the absolute sensors, and
3. filtering of pneumatic inputs to the sensor so as to eliminate associated acoustical disturbances.

The first two of these items involve determining the proper chamber geometry based upon a balance of the acoustic reflections and pneumatic stiffness. The last item involves the use of the series and parallel cavities separated by orifices to control the frequency of acoustic waves that enter the sensor cavity adjacent diaphragm 4.

To reduce the molecular weight or density sensitivity, the cavity B must in general be effectively made smaller than in past practice. Any closed circular cylindric resonator has a reinforcing standing wave when its length (distance between reflecting surfaces) is equal to the length of one half wave and an interference wave when its length is one quarter wave length. The sensor cavity B with the small orifice 21 for an entry port appears as a closed tube, with small secondary effects related to the orifice opening. The resonant frequency of a closed resonator such as cavity B is obviously related to its length; however, this resonance depends upon the temperature of the gas and the molecular weight of the gas. The frequency of the chamber resonance is independent of the gas pressure. The temperature and molecular weight of the gas determine the acoustic wave velocity for the gas. As the acoustic wave velocity changes, the resonance frequency of the cavity changes. Also, waves of any frequency take a different length of time to travel from the diaphragm 4, to rebound from a reflecting surface 18a, and to return to the diaphragm; thus, as the sonic velocity of the gas changes, the diaphragm 4 is affected differently by the acoustic waves. When different gases are used as the media, the molecular weight becomes a variable, and hence, the sensor operates at a slightly different frequency for a given pressure and temperature for different gases. This is molecular weight sensitivity or density sensitivity.

To decrease molecular weight sensitivity, the distance to be traveled by the acoustic wave between surfaces 4a and 18a is made very short. This allows the occurence of a small change in the wave velocity with a minimum effect on the diaphragm response. The shortening of the distance traveled by the acoustic wave can also be thought of as increasing the resonant frequency of the cavity such that it is always much higher than the operating frequency of the diaphragm. Since the two parameters that cause the wave velocity to change are gas molecular weight and temperature, the reduction of the effect of a change in wave velocity reduces the sensitivity of the sensor to changes in molecular weight and temperature. It should be noted that the metal of diaphragm 4 has an inherent small temperature sensitivity and, hence, the foregoing change in chamber geometry reduces only the temperature sensitivity related to the acoustical effects. In fact, the total temperature sensitivity is actually slightly increased in magnitude, but it is simplified from being a dual function of pressure and temperature to substantially a function of pressure only.

The pneumatic spring effect limits how close the reflecting surfaces 4a and 18a may be made. If the volume of the chamber becomes too small in proportion to the volume displaced by the diaphragm vibration, then the stiffness of the gas becomes a significant portion of the total diaphragm stiffness. As the diaphragm 4 oscillates, it pumps gas in and out of chamber B through orifice 21. As the chamber volume becomes smaller, more and more energy is required for the diaphragm to compress and to pump the gas. This gas stiffness can be thought of as a spring attached to the diaphragm, and as the ratio of cavity volume to displacement volume becomes smaller, the stiffness of the spring increases. As this spring becomes stiffer, more energy is required to move diaphragm 4. Hence, to reduce the molecular weight sensitivity of the absolute pressure sensor, the sensor chamber must have the reflecting surface 18a as close to the diaphragm surface 4a as possible, and at the same time retain a reasonable volume in the chamber B. The precise balance of these effects, and hence, the necessary cavity geometry depends arbitrarily upon the pressure range to be measured and the characteristics of the particular diaphragm to be used.

The final area of concern is acoustic filtering. Acoustic interference waves in the pneumatic lines may cause the sensor to be unstable and inaccurate. These acoustic waves come from two sources, outside of the sensor in other parts of the over all system and waves generated within the sensor and reflected from a discontinuity such as a restriction in the associated pneumatic system. To help control this problem, an acoustic filter is incorporated in the sensor chamber configuration. Both orifices and combinations of cavity volumes can be used to filter these waves so as to isolate the sensor from external interference.

Accordingly, it is seen that the invention employs a novel configuration having a self-oscillating diaphragm separating the cavities A and B of FIG. 1, cavities B, C, and D forming effectively a single resonant chamber. The shape and volume of the latter chamber are selected to minimize two important adverse effects:

1. acoustic noise reflections arising from surfaces within the latter chamber and similar noise signals arising within or reflected into the sensor through the pneumatic signal supply line 69, and
2. pneumatic stiffness of the gas within the chambers A, B, and C. The selected configuration provides a wide separation of the undesired acoustic resonances and the range of operating frequencies of diaphragm 4. The configuration provides a divider wall 18 with a surface 18a separated from diaphragm 4 by a distance much less than one quarter wave length at the highest normal operating frequency of diaphragm 4, thereby minimizing the sensitivity of the sensor to acoustic resonance effects. Divider wall 18 locates orifice 21 so as to provide restricted communication between cavities B and C. The combination of cavities B and C with orifice 21 and orifice 68 provides an acoustic low pass filter that passes the desired low frequency signals that are true pressure information signals, while filtering out all high frequency pressure noise components.

In this manner, it is seen that the invention uses common internal parts in compensating for undesired density and acoustic noise effects present in prior art pressure sensors. The invention is not only useful as an absolute pressure transducer yielding an output suitable for use in digital control or instrumentation systems, but may readily be adapted to measure differential pressure values with respect to two varying input pressures. In the latter application, the outer casing 1 may be discarded and the new configuration would substantially take the form of a mirror image arrangement about the plane of diaphragm 4 in FIG. 1, the diaphragm serving in common a lower configuration like that of FIG. 4 and an upper mirror image configuration affixed to annular flange 2 and above diaphragm 4.

Practical devices such as that of FIG. 1 are quite small, involving cavities of very small volume. For example, in one typical form of the invention, the volume of cavity A was about 0.084 cubic inches, while the effective gas-filled volume below diaphragm 4 was about 0.271 cubic inches. Orifice 21 was formed by a bore about 0.029 inches in diameter, divider wall 18 being about 0.050 inches thick at the location of the orifice. The internal diameter of orifice 68 was about 0.125 inches. In view of the small size of such a device, the advantage of forming the cavity system by first machining diaphragm 4 and cylindrical wall 2, 14, 50 portions and separate base 54 and cylindrical wall 15 portions is apparent. The coil and divider wall supporting interior parts of the sensor may be affixed to reentrant part 66, forming a first sub-assembly. The magnet 10, 11 may be affixed to diaphragm 4, forming a second sub-assembly. Using O-ring 13, the two sub-assemblies may then readily be mated prior to forming seal 51. The arrangement whereby the annular electron beam seal 51 is effected as far as possible from the thin diaphragm 4 permits assembly of the cavity system without damaging thermal distortion, including possible asymmetric distortion of diaphragm 4. It will be understood by those skilled in the art that the dimensions and ratios used in drawing FIGS. 1 and 2 are selected with the view of providing drawings that are most fully beneficial in clearly illustrating the invention, and that the invention is not at all limited to dimensions or dimensional ratios expressed or implied in this specification.

Figure 3:
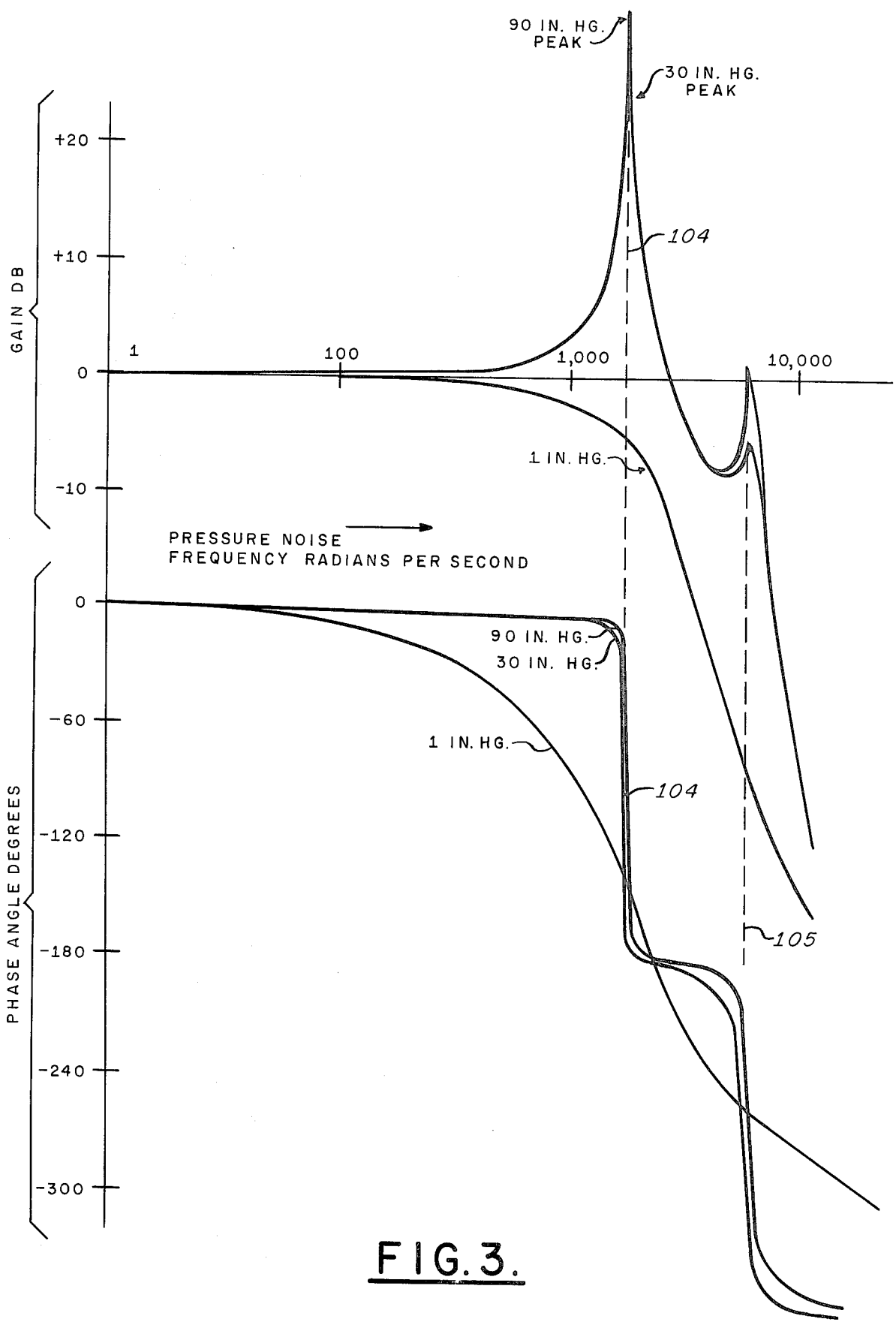
FIG. 3 is a graph useful in explaining the operation of the invention.

FIG. 3 provides curves at 1, 30, and 90 inches of mercury of the gain and phase angle characteristics of the novel transducer system, showing gain and phase characteristics of interest, especially at the vertical dotted lines 104 and 105. Low frequency true pressure data signals are substantially unaffected by the invention, while signals of frequencies somewhat above dotted line 104 are heavily attenuated by the filtering action of the orifice-cavity system.

While the invention has been described in its preferred embodiments, it is to be understood that the words which have been used are words of description rather than of limitation and that changes within the purview of the appended claims may be made without departing from the true scope and spirit of the invention in its broader aspects.

We claim:

1. In fluid pressure measuring apparatus of the kind including a vibratable common wall disposed between first and second chambers, at least said first chamber being adapted for coupling to a source of fluid pressure for providing a differential pressure acting across said vibratable common wall, said vibratable common wall having a resonant frequency changing in accordance with changes in the differential pressure acting thereupon, means responsive to vibration of said vibratable common wall for driving same over a predetermined range of operating frequencies and for providing an output signal corresponding thereto, the improvement comprising:

rigid wall means affixed within said first chamber for dividing said first chamber into first and second cavity means, said first cavity means being bounded in part by said vibratable common wall, said second cavity means being adapted for coupling to said source, and restricted orifice means for mutually coupling said first and second cavity means through said rigid wall means whereby pressure variation frequencies below a predetermined frequency are coupled into said first cavity means to act upon said vibratable common wall, whereas pressure variation noise frequencies above said predetermined frequency are excluded by said first and second cavity means and by said restricted orifice means from acting upon said vibratable common wall.

2. Apparatus as described in claim 1 wherein:

said vibratable common wall takes the form of diaphragm means substantially flat when at rest, and said rigid wall means is disposed substantially parallel to said diaphragm means when at rest and spaced therefrom by a finite distance substantially less than one quarter of a wave length of the highest normal operating frequency of vibration of said diaphragm means.

3. Apparatus as described in claim 2 wherein the ratio of the volume between said rigid wall means and said diaphragm means relative to the volume of gas displaced between the maximum positive and negative deflections of said diaphragm means is so selected as to prevent fluid resistance to compressibility from affecting the amplitude of vibration of said diaphragm means.

4. Pressure measurement apparatus comprising:

a source of gas whose pressure is to be measured, first pressure chamber means, variable pressure chamber means having first and second cavity portions, coupling means for coupling said first cavity portion to said source, diaphragm means forming a common vibratable wall between said second cavity portion and said first pressure chamber means whereby variable differential pressures cause the resonant vibration frequency of said diaphragm means correspondingly to vary, circuit means for driving said diaphragm means and for detecting the consequent vibration frequency thereof, constricted orifice means coupling said first cavity portion to said second cavity portion, said constricted orifice means and said first and second cavity portions being so proportioned as to provide substantial filtering of acoustic noise frequencies greater than a predetermined frequency arising in said source, whereby said acoustic noise frequencies have substantially no effect on the vibratory motion of said diaphragm means.

5. Apparatus as described in claim 4 wherein said constricted orifice means takes the form of a restricted passageway through rigid wall means affixed within said first chamber means for dividing said first chamber means into said first and second cavity portions.

6. Apparatus as described in claim 5 wherein said rigid wall means lies in a plane substantially parallel to said diaphragm means when at rest.

7. Apparatus as described in claim 6 wherein said rigid wall means is spaced from said diaphragm means by a finite distance substantially less than one quarter wave length at the highest operating frequency of said diaphragm means whereby sensitivity of said diaphragm means to acoustic resonance effects is substantially eliminated.

8. Pressure measurement apparatus comprising, first hollow cylindrical wall means having first and second ends, vibratable diaphragm means formed integrally with said first hollow cylindrical wall means at said first end thereof, second hollow cylindrical wall means having third and fourth ends, said first and second hollow cylindrical wall means including spaced-apart adjacent parallel wall portions forming a clearance region, base means formed integrally with said second hollow cylindrical wall means at said third end thereof, said second end of said first hollow cylindrical means being sealed to said base means remote from said vibratable diaphragm means.

inductive means for driving said diaphragm means and for detecting vibrations thereof, said inductive means having at least one part supported by said base means in cooperative driving relation with said diaphragm means, and annular flexible hermetic seal means at said first and fourth ends of said respective first and second hollow cylindrical wall means.

9. Apparatus as described in claim 8 additionally including enclosure means affixed to said base means and enclosing said first hollow cylindrical wall means and said vibratable diaphragm means.

10. Apparatus as described in claim 8 further including:

rigid wall means affixed within said first hollow cylindrical wall means at said fourth end substantially parallel to said vibratable diaphragm means, said rigid wall means including restricted orifice means passing therethrough, said rigid wall means forming first and second cavity means cooperating with said orifice means for preventing propagation of acoustic noise signals toward said vibratable diaphragm means.

11. Apparatus as described in claim 10 further including aperture means through said second hollow cylindrical wall means whereby said aperture means and said restricted orifice means provide substantial equalization of the pressure across said flexible hermetic seal means.

12. A fluid pressure sensor comprising:

a pair of chambers having a thin common vibratable diaphragm therebetween, one of said chambers being coupled to a source of fluid pressure thereby to provide a differential pressure acting across said diaphragm having a resonant frequency changing in accordance with changes in said differential pressure over a predetermined range of pressures, means for sensing and driving said diaphragm at said resonant frequency and providing an output signal corresponding thereto, rigid wall means dividing said one chamber into a plurality of cavities, one of said cavities cooperating with said diaphragm and another thereof with said fluid pressure source, said wall means being substantially coextensive with and substantially parallel to said diaphragm and spaced therefrom by a distance less than a quarter wave length of the highest resonant frequency of said diaphragm, and orifice means in said wall means coupling said cavities to said fluid pressure source.

13. The pressure sensor as set forth in claim 12 wherein the volumes of said cavities and the size of said orifice means are such as to render said diaphragm uninfluenced by pressure frequencies above those associated with the highest pressure of said range of pressures.

* * * * *